US006684259B1

(12) United States Patent
Discavage et al.

(10) Patent No.: US 6,684,259 B1
(45) Date of Patent: *Jan. 27, 2004

(54) METHOD FOR PROVIDING USER GLOBAL OBJECT NAME SPACE IN A MULTI-USER OPERATING SYSTEM

(75) Inventors: Michael Jerome Discavage, Margate, FL (US); Edward Ernest Iacobucci, Coral Springs, FL (US)

(73) Assignee: Citrix Systems, Inc., Ft. Lauderdale, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/541,020

(22) Filed: Oct. 11, 1995

(51) Int. Cl.[7] ................................. G06F 9/46
(52) U.S. Cl. ................. 709/316; 709/328; 709/331; 709/201
(58) Field of Search .............. 395/650, 725; 709/100, 104, 300, 302, 304, 315, 316, 203, 331, 332, 201, 328; 364/246, 246.11

(56) References Cited

U.S. PATENT DOCUMENTS

| 4,387,425 A | | 6/1983 | El-Gohary ............... 364/200 |
|---|---|---|---|
| 4,779,189 A | | 10/1988 | Legvold et al. ........... 364/200 |
| 4,825,354 A | * | 4/1989 | Agrawal et al. ........... 707/10 |
| 4,887,204 A | | 12/1989 | Johnson et al. ........... 364/200 |
| 4,937,784 A | | 6/1990 | Masai et al. .............. 364/900 |
| 5,014,221 A | | 5/1991 | Mogul ..................... 364/519 |
| 5,031,089 A | | 7/1991 | Liu et al. ................. 364/200 |
| 5,057,996 A | * | 10/1991 | Cutler et al. .............. 364/200 |
| 5,119,319 A | | 6/1992 | Tanenbaum ............... 364/514 |
| 5,129,084 A | | 7/1992 | Kelly, Jr. et al. .......... 395/650 |
| 5,142,680 A | | 8/1992 | Ottman et al. ............ 395/700 |
| 5,155,847 A | | 10/1992 | Kirouac et al. ........... 395/600 |
| 5,175,852 A | | 12/1992 | Johnson et al. ........... 395/600 |
| 5,187,790 A | * | 2/1993 | East et al. ................ 395/725 |
| 5,202,971 A | | 4/1993 | Henson et al. ............ 395/425 |

(List continued on next page.)

FOREIGN PATENT DOCUMENTS

| EP | 0 381 645 A2 | 8/1990 | ......... G06F/15/16 |
|---|---|---|---|
| EP | 0 384 339 A2 | 8/1990 | ......... G06F/9/46 |
| EP | 0 540 151 A2 | 5/1993 | ......... G06F/9/46 |
| EP | 0 648 038 A2 | 4/1995 | ......... H04L/29/06 |
| WO | WO 93/15457 | 8/1993 | ......... G06F/9/00 |
| WO | WO 94/14114 | 6/1994 | ......... G06F/9/00 |

OTHER PUBLICATIONS

Prasad, S. "Weaving a Thread: Solaris and Windows NT both support powerful multithreading/multiprocessing to help get the job done faster" *Byte*, Oct., pp. 173–174 (1995).

(List continued on next page.)

*Primary Examiner*—St. John Courtenay, III
(74) *Attorney, Agent, or Firm*—Testa, Hurwitz & Thibeault, LLP

(57) ABSTRACT

A method, suitable for use in client/server system, which allows multiple copies of a single-user application to run simultaneously in a multi-user operating system without modification of the single-user program, by modifying existing operating system methods used for object name creation, look-up, and deletion. The method creates a user global context by labeling each instance of the single-user application with a user identifier (name) that defines a single-user name space in which each labeled object is only available to the named user. In addition, the single-user server process is allowed to impersonate the client for allowing the server to access the named resources of the single-user name space. A coexisting system global context is also created by marking system global named resources.

26 Claims, 6 Drawing Sheets

U.S. PATENT DOCUMENTS

| | | | | |
|---|---|---|---|---|
| 5,204,897 A | | 4/1993 | Wyman | 380/4 |
| 5,241,625 A | | 8/1993 | Epard et al. | 395/163 |
| 5,247,683 A | | 9/1993 | Holmes et al. | 395/700 |
| 5,249,290 A | | 9/1993 | Heizer | 395/650 |
| 5,297,283 A | | 3/1994 | Kelly, Jr. et al. | 395/650 |
| 5,305,440 A | | 4/1994 | Morgan et al. | 395/200 |
| 5,321,841 A | * | 6/1994 | East et al. | 395/725 |
| 5,325,527 A | | 6/1994 | Cwikowski et al. | 395/650 |
| 5,329,619 A | * | 7/1994 | Page et al. | 709/203 |
| 5,339,430 A | | 8/1994 | Lundin et al. | 395/700 |
| 5,341,478 A | * | 8/1994 | Travis et al. | 709/203 |
| 5,367,633 A | | 11/1994 | Matheny et al. | 395/164 |
| 5,367,688 A | | 11/1994 | Croll | 395/700 |
| 5,369,766 A | | 11/1994 | Nakano et al. | 395/700 |
| 5,371,891 A | | 12/1994 | Gray et al. | 395/700 |
| 5,386,558 A | * | 1/1995 | Mauldin et al. | 707/104 |
| 5,418,964 A | | 5/1995 | Conner et al. | 395/700 |
| 5,423,041 A | | 6/1995 | Burke et al. | 395/700 |
| 5,437,025 A | | 7/1995 | Bale et al. | 395/600 |
| 5,440,719 A | | 8/1995 | Hanes et al. | 395/500 |
| 5,457,797 A | * | 10/1995 | Butterworth et al. | 395/650 |
| 5,581,765 A | * | 12/1996 | Munroe et al. | 709/107 |
| 5,598,562 A | * | 1/1997 | Cutler et al. | 709/104 |

OTHER PUBLICATIONS

Mann et al., "Terminal Servers on Ethernet Local Area Networks", *Digital Technical Journal*, No. 3, pp. 73–87, Sep. 1986.

"Allocation of Equivalent Communication Buffer Sizes in SQLJRA Remote Protocol", *IBM Technology Disclosure Bulletin*, vol. 36 No. 1, pp. 29–31, Jan. 1993.

Abe et al., "Distributed Cooperative Control for Sharing Applications Based on the MERMAID Multiparty and Multimedia Desktop Conferencing System", *NEC Research and Development*, No. 1, pp. 122–131, Jan. 1993.

"OS/2 EE Database Manager SQLJRA Remote Protocol", *IBM Technical Disclosure Bulletin*, vol. 36 No. 1, pp. 33–36, Jan. 1993.

"Storage of User Preferences on a Per–User Basis", *IBM Technical Disclosure Bulletin*, vol. 36 No. 1, p. 64, Jan. 1993.

"Dynamic Host Configuration Protocol", Droms, R., *Bucknell University*, pp. 1–39, Oct. 1993.

"Changing System Configuration for Shared Windows Applications", IBM, *Technical Disclosure Bulletin*, vol. 37 No. 02B, Feb. 1994.

Adler, "Distributed Coordination Models for Client/Server Computing", *Computer*, No. 4, pp. 14–22, Apr. 1995.

Prasad, "Weaving a Thread", *Operating Systems Core Technologies*, pp. 173–174, Oct. 1995.

"IP Multicast Streamlines Delivery of Multicast Applications", *Cisco Systems Inc.*, pp. 1–5, Mar. 1995.

Campbell et al., "Meeting End–to End QoS Challenges for Scalable Flows in Heterogeneous Multimedia Environments", pp. 101–115, Nov. 1995.

"Multicast Routing", *Cisco Systems Inc*, pp. 1–4, 1995.

"Windows NT Browser", *Cisco Systems Inc Windows NT Browser*, pp. 79–87, Chapter 5.

Liu et al., "Efficient Algorithms for Resource Allocation in Distributed and Parallel Query Processing Environments", pp. 316–323.

Cheng et al., "On the Performance Issues of Object–Based Buffering", Dept. of Electrical and Computer Engineering, The Pennsylvania State University, pp. 30–37, 1991.

Jeff Holtzman; "Byte"; *Merge 386; Run Unix and DOS together on an 80386*; pp. cover sheet; 207–208, 211–212 (Dec. 1988).

Jon Udell; "Byte"; *Citrix's New Multiuser OS/2; OS/2–based workgroup computing without a LAN; 16* (No. 1):4, 134–136, 138 (Jan. 1991).

John Unger; "Byte"; *The Sun386i, A Unix color graphics workstation that runs MS–DOS*; pp. cover sheet, 183–188 (Dec. 1988).

\* cited by examiner

|  | EXE/DLL MARKED SystemGlobal | EXE/DLL NOT MARKED SystemGlobal |
|---|---|---|
| SystemGlobal NOT SPECIFIED ON API CALL | SystemGlobal | UserGlobal |
| SystemGlobal SPECIFIED ON API CALL | SystemGlobal | SystemGlobal |

FIG. 4

METHOD FOR PROVIDING USER GLOBAL OBJECT NAME SPACE IN A MULTI-USER OPERATING SYSTEM

FIELD OF INVENTION

The invention relates to multi-user distributed process systems having a master process and a plurality of service processes and a method for adapting applications written for a single user environment for use in the multi-user system without recompiling.

BACKGROUND TO THE INVENTION

The distributed process system described is a multi-user and multi-tasking system. Applications written for a multi-user environment typically assume that more than one copy of the application may be active at the same time. Multi-tasking operating systems (Windows NT and Unix for example) provide the capability to create various types of shared objects for providing interprocess communications and synchronization. By associating a name with an object, it allows for one process to create an object and for another process to make use of it. Synchronization ensures that only one process has control of a resource at a time. Resources include objects such as global variables, common data memory, file handles, and shared object handles.

Shared objects used for synchronization and interprocess communication include:

Semaphores and event objects for coordinating threads;

Mutexes, a mutually exclusive semaphore allowing a single thread access at a time;

Named Pipes for duplexed interprocess and interprocessor connection;

Message Queues for one way, many to one communications; and

Shared Memory for use by all processes that have authorized access.

If an application was written for a single user for running under a single user operating system, such as Windows NT (produced by Microsoft Corp. of Redmond, Wash.), and then is run in a multi-user environment under a compatible multi-user operating system, such as WinFrame™ (produced by Citrix Systems, Inc. of Coral Springs, Fla.), in a multi-user environment, it is possible for name collisions to occur if more than one copy of the same application is executed at the same time. The application would have to be modified and recompiled in order for it to execute reliably in the multi-user environment.

The present invention modifies the existing methods used for object name creation, look-up, and deletion in a multi-user operating system so that multiple copies of a single user application are able to run simultaneously.

SUMMARY OF THE INVENTION

A method is described for allowing a single-user application program to operate in a multi-user operating system without modification of the single-user program by modifying existing operating system methods used for object name creation, look-up, and deletion, so that multiple copies of a single-user application program are able to run simultaneously.

The method includes the following steps:

a) assigning a unique identifier to each user on the system and each of the user's applications, and attaching this same identifier to each instance of an object created by the user's applications, for the purpose of creating a distinct single user name space that is only accessible by the same single user; and b) enabling a server process that is serving the application of the single user process to impersonate the single user process by assuming the identity of the single user process, for allowing the server process to access the single user name space.

In this manner, the server process assumes the role of the user, has access to the user's private name space and to all objects required for serving the user's application. The combination of user labeling and user impersonation allows multiple copies of a given application to run simultaneously even though the application was written for a single-user operating system.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiment but are only for explanation and understanding.

FIG. 4 describes the context of named resources that depend on the .EXE/.DLL overrides and on the API override values.

DETAILED DESCRIPTION OF THE INVENTION

Two important operating system (OS) features for use in a client-server distributed process system are multi-tasking and multi-user operation.

Multi-tasking is the ability to run more than one program at a time by dividing each task into multiple "threads" or subtasks so that distinct tasks can share a single processor by multiplexing the threads of each task. In this manner, each distinct task is given access to the processor on a shared basis. Priority based scheduling manages the processor time each task or process is allocated.

In an OS like Windows NT, each process is divided into multiple threads for execution. The threads are run while the processes are never run. Each process may consist of one or more threads. Each thread has an assigned priority level that can be set independently.

A "process" is a single group of memory addresses in which some of the addresses are allocated to program steps while the rest are allocated for data required by the program steps. Typically, processes do not share memory with other processes because each process is structured as a single entity and its memory space is protected from unauthorized access by other processes. Multiple threads are created within a process with each thread having access to all memory and other resources within the process.

Each thread has three possible states that include:

Running—when the thread is executing;

Ready—when thread is waiting for other threads to finish executing; and

Blocked—when the thread is waiting for some event to occur.

Because processes may have need to communicate with each other, a variety of methods are provided that include synchronization and interprocess communication objects such as:

Event objects for notifying a waiting thread that an event has occurred;

Mutex (mutual exclusion) objects for use between processes to ensure only one process has access at a time;

Semaphore objects for use when a counter is required for limiting the number of threads that can use a given resource;

Named Pipe objects are one way or duplex stream connections between two processes; and Communication Port objects are message connections between two processes.

By associating a name with each of these objects, the objects become capable of being shared between processes. An additional named object is named shared memory that allows one process to create the named object and another to make use of it in a multi-tasking system.

Figure 1:
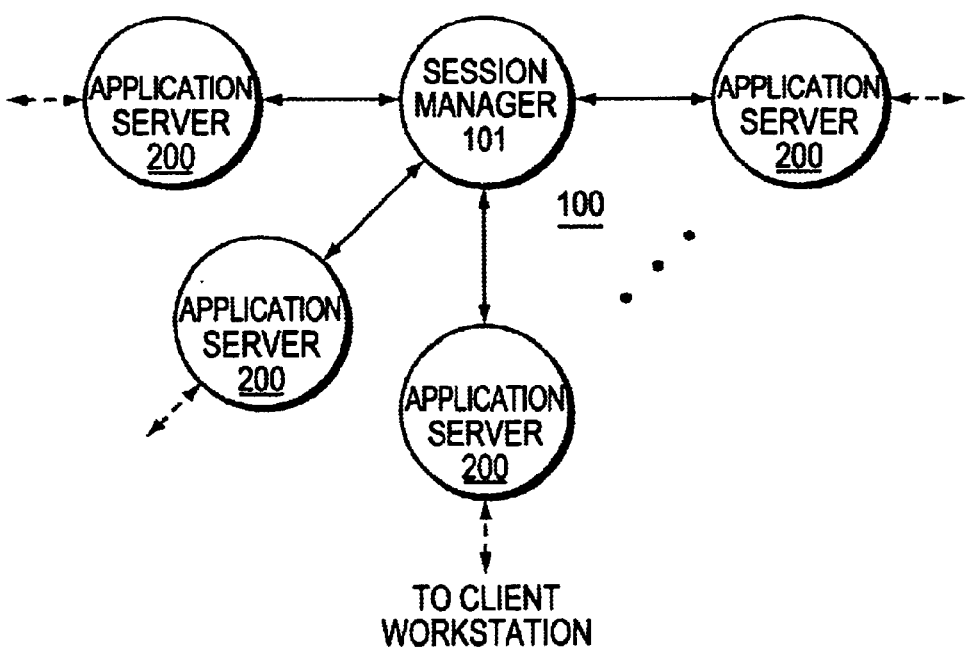
FIG. 1 is shows the relationship between a session manager and multiple application servers in a multi-user system.

FIG. 1 shows the architecture of a multi-user application server system 100 resident in a host system and includes a session manager 101 and and a number of application servers 200. Each application server 200 interfaces to a client (user) workstation for running the client's application in the host system by inputting data from and providing processed data and display data to the associated client workstation. The host system contains common resources that are shared amongst the numerous client workstations through the associated application server 200.

In a multi-user multi-tasking system as shown in FIG. 1, applications must be written so that more than one copy of the application can run at the same time without object name collisions occurring. However, most applications written for a single user environment implicitly assume that only one copy of the application will be active in the system at a given time. Consequently, if more than one such application were to be run at the same time in a multi-user environment, there is a reasonable probability for name collisions to occur. This would make it impractical to use many existing single user applications in a multi-user environment without modifying the application program.

For example, if a single user Windows NT operating system application that uses a named resource, such as a semaphore, were to attempt to run in a multi-user environment, it would initially attempt to create the named semaphore. However, if the same application had been previously started by another user, the attempt to create the named semaphore would fail. This type of application would have difficulty running multiple instances of itself in a single user environment. In order for it to run in a multi-user environment (e.g. under operating system WinFrame™), constructs must be included that localize global resources to the user level. The named resources that can run into this type of problem include: semaphores, named pipes, queues, communication ports, and named shared memory.

Figure 2A:
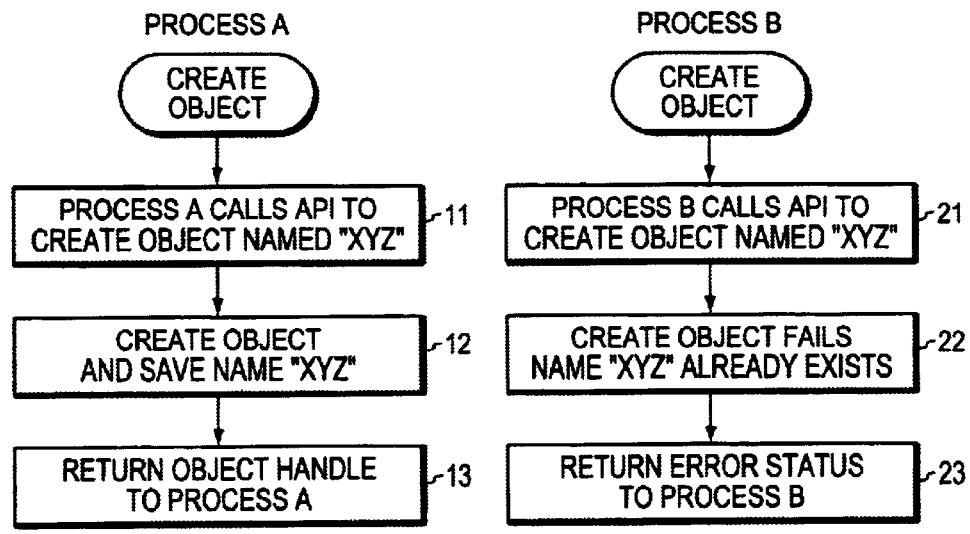
FIG. 2(a) shows an example of a prior art create-object call.
Figure 2B:
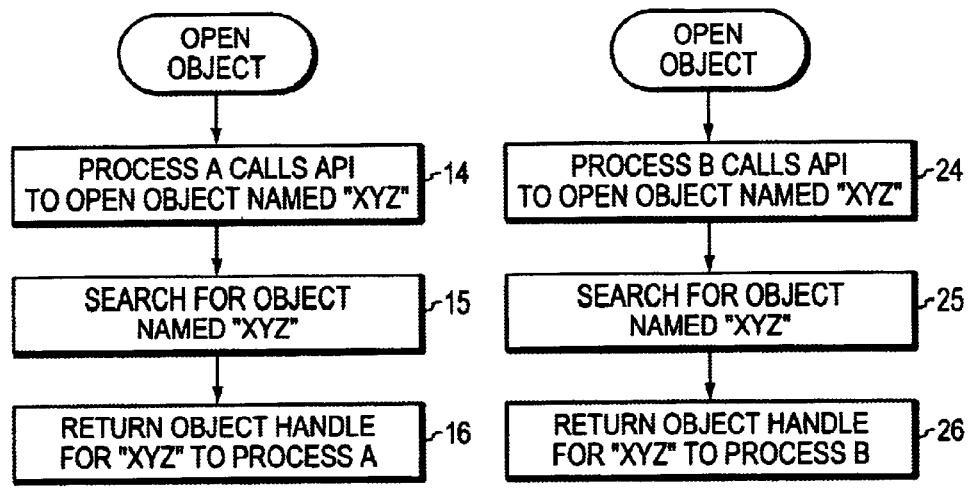
FIG. 2(b) shows an example of a prior art open-object call.
Figure 2C:
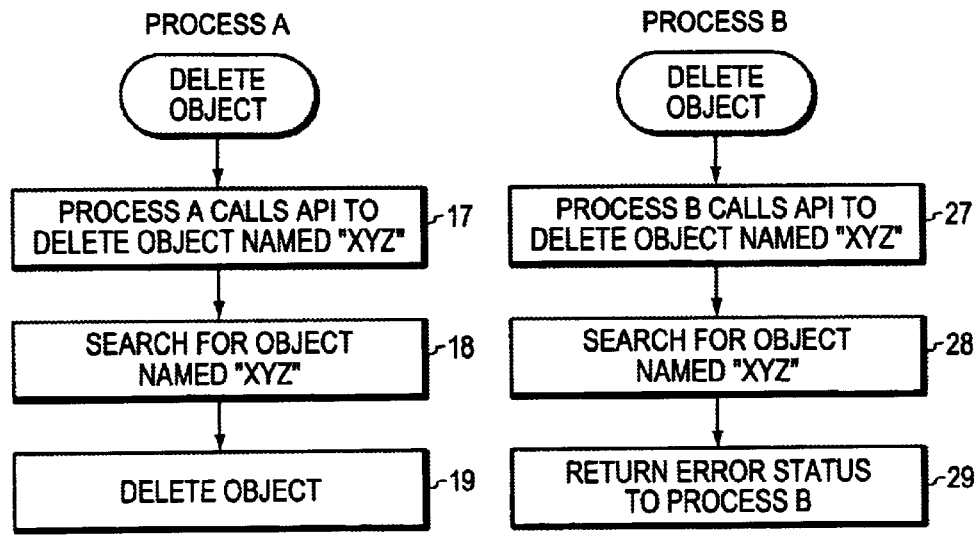
FIG. 2(c) shows an example of a prior art delete-object call.

FIGS. 2(a,b,c) are flow diagrams depicting the actions and results when two single-user processes (process A and process B) attempt to operate in a multi-user prior art environment. The first column (on the left) shows actions initiated by process A and the results while the second column shows the actions taken by process B and the results. The three flow diagrams are: FIG. 2(a) for creating an object named "XYZ"; FIG. 2(b) for opening an object named "XYZ"; and FIG. 2(c) for deleting an object named "XYZ".

In step 11 of FIG. 2(a), application process A calls an application program interface (API) in the host systems operating system (OS) kernel for creating an object named "XYZ". Then process B makes the same request in step 21. In step 12, object "XYZ" is created by the OS kernel as requested by process A and the name is stored. However, the request by process B in step 22 fails because the OS finds that the named object "XYZ" already exists. As a result process A receives the required object handle in step 13 while process B receives an error status message.

In FIG. 2(b), both application processes A and B call an API to open the object named "XYZ". The OS conducts a search for object "XYZ" in steps 15 and 25. The two searches find the previously created object named "XYZ" and the object handle is returned to process A and B respectively in steps 16 and 26.

In FIG. 2(c) at step 17, process A calls an A for deleting an object named "X". Assume that process B subsequently makes the same request in step 27. As a result, the request by process A causes a search for the object named "XYZ" in step 18 and results in the object being deleted in step 19. Because of the earlier request to delete by process A, the search for the object named "XYZ" in step 28 fails and step 29 returns an error status message.

The actions and results shown in FIG. 2(b) are not proper because process B gained access to object "XYZ" created by process A and not to the process named "XYZ" that was to be created by process B. Similarly, the actions and results shown in FIG. 2(c) may be undesirable because an object named "XYZ" could be deleted by either process A or B as determined by which process called for the deletion first.

In order to accommodate Windows NT, single user applications in a multi-user WinFrame™ operating environment, the following steps are taken:

(1) all application program interface (API) calls by a given user for these named resources are intercepted;

(2) a user identifier is added to the name before it is passed on in the API call; and (3) all applications running on behalf of the given user will have the named requests for resources identically modified.

In this manner, these named resources are made "user global" which makes them shareable only within the given user's context.

FIGS. 3(a,b,c) steps taken to accommodate single user applications in the multi-user system and the consequence of actions taken by process A on the left and process B on the right.

Figure 3A:
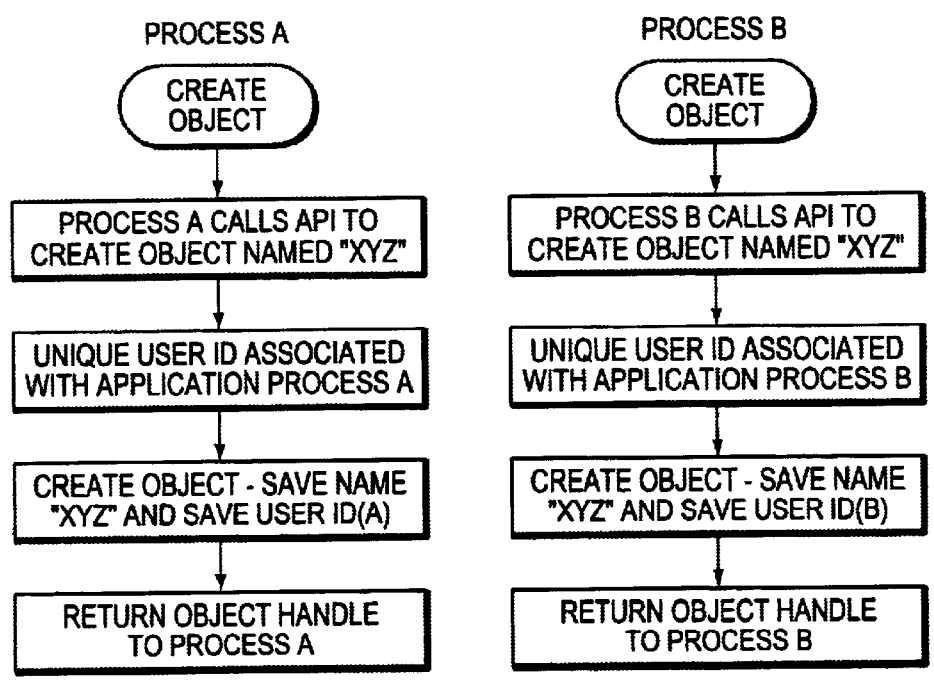
FIG. 3(a) shows a create-object call example in a system with user global name space.

In FIG. 3(a) at step 30, process A calls an API in the OS kernel to create an object named "XYZ". The OS assigns ID(1) as a unique user identification (ID) associated with application process A in step 31. In step 32, the OS creates the object and saves the name "XYZ" together with the unique user ID(A). In step 33 the system returns the object handle to process A. Meanwhile, process B initiates similar actions in step 50 calling for the creation of an object named "XYZ" with the result that a unique user ID(B) is associated with the application process in step 51 and an object named "XYZ" is created in step 52 and the name is saved together with ID(B). The object handle for the object named "XYZ" associated with ID(B) is returned to process B. It should be noted that process A and B refer to their respective objects named "XYZ" using the same name but the OS clearly distinguishes them because of the associated user ID.

Figure 3B:
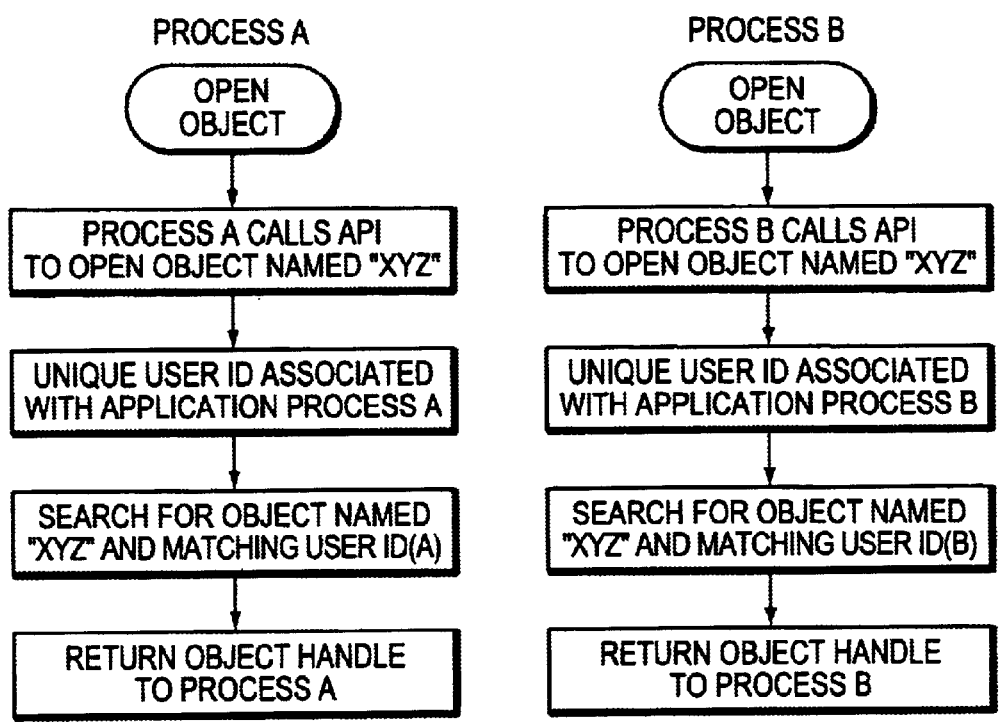
FIG. 3(b) shows an open-object call example in a system with user global name space.

FIG. 3(b) is a flow diagram for opening an object by process A and B. Instep 34, process A calls an API to open an object named "XYZ". In step 35 the unique ID that has been assigned to process A, ID(A), is retrieved by the OS and a search for the object named "XYZ" with the assigned unique user ID is made in step 36. If a match is found for both the name "XYZ" and ID(1), step 37 returns the handle for the desired object. Step 54 initiates a similar call from application process B to open an object named "XYZ" and the OS assigns the unique user ID, ID(B), associated with process B and searches for object "XYZ" together with ID(B). Because of the unique ID assigned to each process, two same named objects can be separately supported by the OS. Consequently, step 56 searches and is able to find object "XYZ" belonging to process B. The proper object handle is returned to process B in step 57.

Figure 3C:
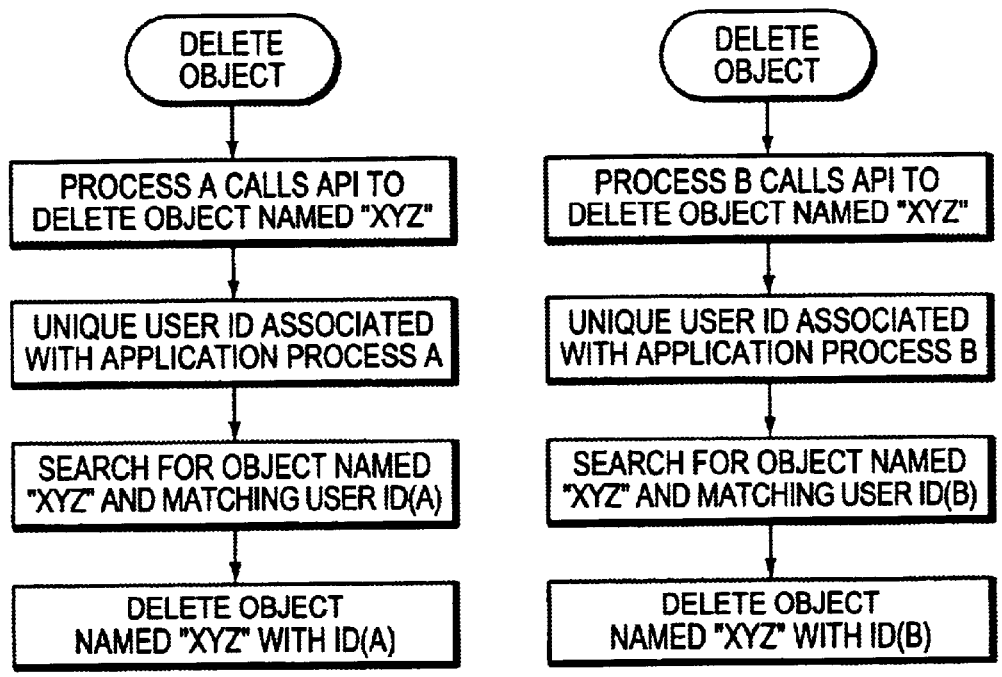
FIG. 3(c) shows a delete-object call example in a system with user global name space.

FIG. 3(c) is a flow diagram of deleting objects having the same name "XYZ". In step 38, process A calls an API to delete the object named "XYZ". Again the OS retrieves the unique identifier ID(A) associated with process A in step 39 and proceeds to search for "XYZ" with matching identifier ID(A). When found, the object is deleted in step 41. Similarly, process B calls for deletion of object "XYZ" in step 58 and the following steps 59, 60 and 61 result in the deletion of object "XYZ" associated with ID(B).

Thus, by associating a unique ID with each named object, a single user application can be used in a multi-user system without modification by using the OS modifications described above.

Indiscriminately applying the user identifier to API calls can lead to problems. For example, if a multi-user application uses a system semaphore to serialize access to a protected resource,sa "system global" context is needed rather than a user global context. Because the characteristics of the application making the API call are not readily available to the application program kernel, this potential problem is resolved by (1) establishing user global as the default context,
(2) establishing a system global context,
(3) enabling an application to select between user global and system global context for a specific named object on an individual API basis by appending a context modifier to the name of the named object, and
(4) enabling the marking of specific application executable (.EXE) files or dynamically linkable library (.DLL) files so that all API calls from the executable or dynamically linked files are of the system global context.

In the WinFrame™ environment, multi-user applications and dynamic link libraries can intermix allocation of system global and user global named resources from within the same .EXE or .DLL. Because WinFrame™ requires that the resource type be specified at the end of the name string, accommodation of the named resource APIs require that the applications append the system global identifier to the name string.

FIG. 4 describes the context of named resources as a function of the user and system global modifiers applied to .EXE/.DLL and to the API call. If system global is not specified in the API call, the context is system global if .EXE/.DLL is marked system global. Otherwise, the context is user global. If the API call specifies system global, the context is system global independent of the .EXE/.DLL marking.

Because the client portion of an application in a distributed process client-server system generally resides at another location than the server, the server must verify the security or privilege level of the client. Also, if the client makes a request to access data in a file controlled by the server by use of an API call to open, read, or write the file, the server must have open/read/write privileges for that file. For example, if the file to be accessed by the application server is owned by the client as a user global file, access would be limited to the client. The concept of "impersonation" provides a means for resolving this dilemma.

Impersonation allows servers to access data on behalf of privileged clients by assuming the security level of the client. With this arrangement, a user on the network without the proper security clearance would be denied access to a file through the application server when the server attempts accessing the file by impersonating the unauthorized user. The client's APIs provide the information needed for a thread to take on the security context of the client. The named thread then receives the proper access validation.

Because it is possible that a multi-user server process will service requests from several single-user application processes, it is necessary that the multi-user server process be able to access the correct user global name space when referencing a named object on behalf of some single-user application process. For this purpose, the concept of user impersonation is used and extended so that impersonation not only allows the server process to assume the security context of the client process but also allows it access to the object name space of the client process.

A method for allowing single user applications to operate in a multi-user environment without modification of the single user application has been described. The method involves modification of the multi-user operating system by creating distinct user name spaces that have a user global context and by extending the concept of impersonation to make the user name spaces available to the application server.

Figure 5:
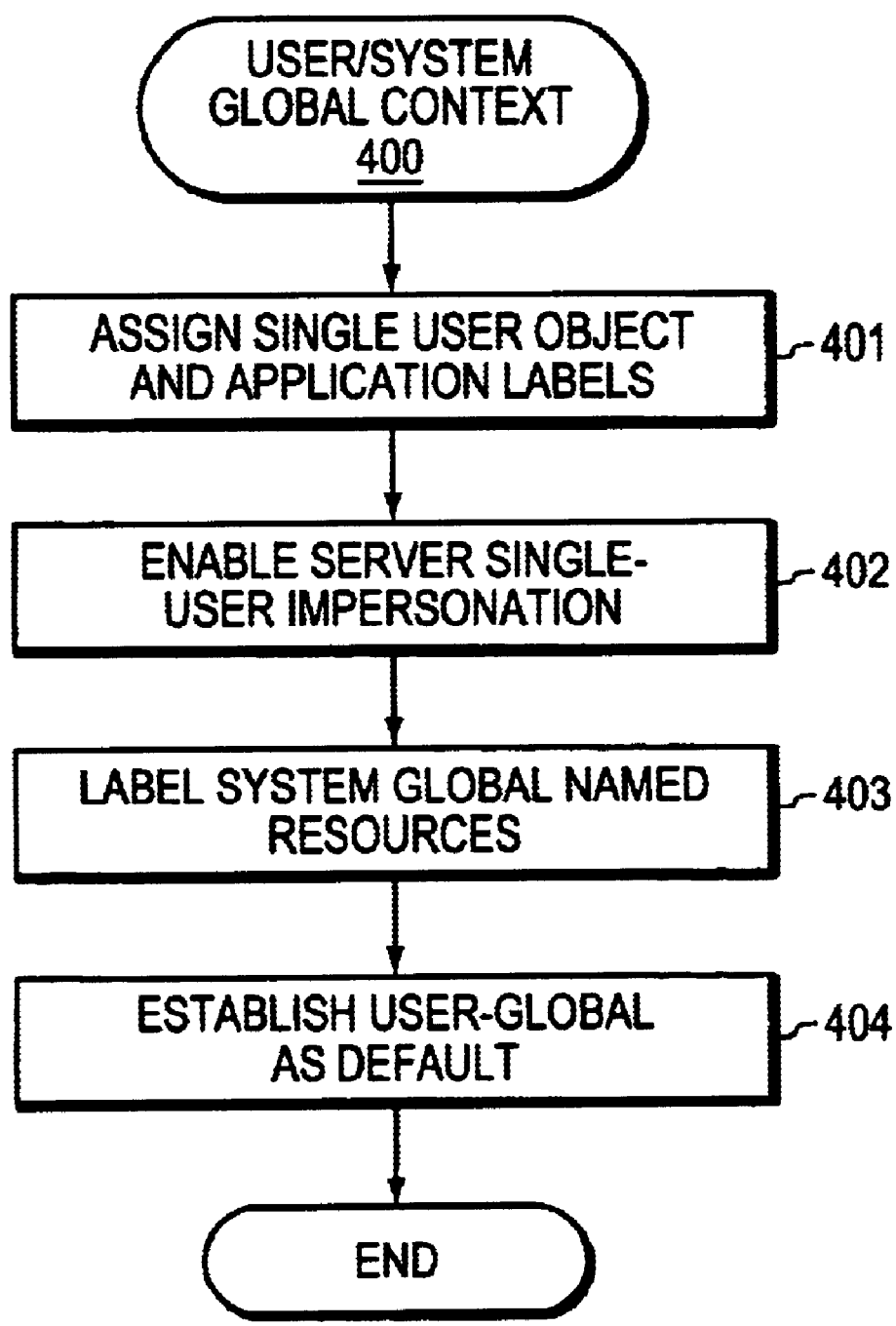
FIG. 5 is a flow diagram for creating a user and system global context.

The method described above is further summarized in the flow diagram of FIG. 5 where it is identified as method 400 for creating a coexistant user and system global context. Step 401 establishes a user global context by assigning a label to each instance of an object or application that is to be used by a single user. A single-user name space is thereby created by identifying each such instance as being globally available to the specified single-user. Step 402 enables the server process to impersonate the single-user by assuming its identity and thereby provides the server access to the single-user name space. Step 403 establishes a system global context by adding a system global identifier to each of the executable files and dynamically linkable library files. The method ends with step 404 establishing the user global context as the default context.

As will be understood by those skilled in the art, many changes in the methods described above may be made by the skilled practitioner without departing from the spirit and scope of the invention, which should be limited only as set forth in the claims which follow.

What is claimed is:

1. In a multi-user operating system environment, a method for enabling multiple users to execute simultaneously an application program developed for execution by only a single user at a time without modifying the application program, the method comprising:

(a) associating a unique identifier with each user executing a copy of the single-user application program in the multi-user operating system environment; and (b) assigning to an instance of an object created by an execution of one copy of the single-user application program a unique tag that includes the unique identifier associated with the user executing that one copy of the application program to distinguish that instance of the object from another instance of the object created by an execution of another copy of the application program executed by another user, thereby enabling multiple instances of the same object generated by simultaneously executing copies of the application program to coexist in the multi-user operating system environment.

2. The method of claim 1 wherein the step of assigning a unique tag to each instance of an object, further comprises attaching the unique identifier to a shared object identifier.

3. The method of claim 2 wherein the shared object is an application.

4. The method of claim 2 wherein the shared object is a section of memory.

5. The method of claim 2 wherein the shared object is a pipe object.

6. The method of claim 5 wherein the synchronization object is a pipe object.

7. The method of claim 2 wherein the shared object is a communication port object.

8. The method of claim 2 wherein the shared object is a synchronization object.

9. The method of claim 8 wherein the synchronization object is an event object.

10. The method of claim 8 wherein the synchronization object is a mutex object.

11. The method of claim 8 wherein the synchronization object is a semaphore object.

12. The method of claim 1 further comprising modifying performance of an operating system method selected from the group consisting of object name creation, object name look-up, and object name deletion.

13. The method of claim 1 further comprising impersonating by a server process a client process executing the one copy of the application program by using the unique identifier associated with the user executing the one copy of the application program.

14. The method of claim 13 further comprising accessing by the server process the instance of the object assigned the unique tag.

15. The method of claim 1 further comprising associating the unique identifier with the one copy of the application program executed by the user.

16. The method of claim 1 further comprising sharing the instance of the object between a first process associated with the user and a second process associated with the user.

17. A method for creating a user global context for allowing an application program developed for execution by only a single user at a time to operate in a multi-user operating system environment without modifying the single user application program, and for providing a coexisting system global context by modifying the operating system methods used for object name creation, look-up, and deletion, the method comprising:

(a) establishing a user global context by assigning a unique tag to each instance of an object and to each copy of the single-user application program, the unique tag assigned to each instance of the object identifying that single user and creating a distinct single-user name space by identifying that instance of the object as being globally available to the single user only;

(b) enabling a server process that is serving the application program of the single user to impersonate the single user by assuming the identity of the single-user process, thereby allowing the server process to access the single-user name space; and (c) establishing a system global context by labeling each system global named resource by adding a system global identifier to each of the system global named resource's associated executable files and dynamically linkable library files.

18. The method of claim 17 further comprising the step of establishing the user global context as a default context.

19. A method for enabling concurrent execution of multiple instances of a single-user application program in a multi-user operating system environment without modifying the single-user application program, the method comprising the steps of:

associating with each process executing one of the multiple instances of the single-user application a unique identifier that includes an identifier of the single user executing that process;

generating a different instance of an object for each process using that object during execution of the instances of the single-user application program;

assigning each object instance with a label that uniquely associates that object instance with the unique identifier of the process using that object instance; and limiting use of each object instance to the process with the unique identifier that is uniquely associated with the label of that object instance.

20. The method of claim 19 further comprising the step of impersonating a given process to obtain access to each object instance associated with the given process.

21. The method of claim 20 wherein a server process that is serving the instance of the single-user application program executed by the given process impersonates the given process by assuming an identity of the given process.

22. The method of claim 19 further comprising the step of modifying operating system methods that create, access, and delete object instances such that the operating system methods associate each object instance with the unique user identification of the process using that object instance.

23. The method of claim 19 further comprising the step of marking a file associated with a system resource with a system global identifier to indicate that calls from the file to use the system resource have a system global context.

24. The method of claim 23 wherein the file is an executable (.exe) file.

25. The method of claim 23 wherein the file is a dynamic link library (.dll) file.

26. The method of claim 19 further comprising the step of specifying a system global context in an application program interface (API) call to a system resource.

* * * * *